(12) United States Patent
Fujita

(10) Patent No.: US 8,345,401 B2
(45) Date of Patent: Jan. 1, 2013

(54) SEMICONDUCTOR DEVICE

(75) Inventor: Masashi Fujita, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 559 days.

(21) Appl. No.: 12/569,416

(22) Filed: Sep. 29, 2009

(65) Prior Publication Data

US 2010/0079921 A1 Apr. 1, 2010

(30) Foreign Application Priority Data

Sep. 30, 2008 (JP) ................................. 2008-254944

(51) Int. Cl.
*H02H 3/22* (2006.01)
(52) U.S. Cl. ........................................................ 361/119
(58) Field of Classification Search .................... 361/119
See application file for complete search history.

(56) References Cited

U.S. PATENT DOCUMENTS

| | | | |
|---|---|---|---|
| 5,617,283 A * | 4/1997 | Krakauer et al. ............... | 361/56 |
| 5,736,728 A | 4/1998 | Matsubara | |
| 5,815,355 A * | 9/1998 | Dawes ............................ | 361/56 |
| 6,097,292 A | 8/2000 | Kelly et al. | |
| 6,427,065 B1 | 7/2002 | Suga et al. | |
| 6,799,015 B1 | 9/2004 | Tiwari | |
| 6,879,809 B1 | 4/2005 | Vega et al. | |
| 6,933,764 B2 * | 8/2005 | Devin ............................. | 327/309 |
| 7,405,612 B2 | 7/2008 | Minami et al. | |
| 2005/0122651 A1 | 6/2005 | Fischer et al. | |
| 2005/0161508 A1 | 7/2005 | Akaida et al. | |
| 2005/0280509 A1 | 12/2005 | Tanaka et al. | |
| 2005/0282505 A1 | 12/2005 | Umeda et al. | |
| 2006/0116968 A1 | 6/2006 | Arisawa | |
| 2006/0128345 A1 | 6/2006 | Ootaka et al. | |
| 2006/0133545 A1 | 6/2006 | Kunc et al. | |
| 2006/0164215 A1 | 7/2006 | Kofler | |
| 2006/0170054 A1 | 8/2006 | Mergens et al. | |

(Continued)

FOREIGN PATENT DOCUMENTS

EP 1 914 669 A2 4/2008

(Continued)

OTHER PUBLICATIONS

European Search Report re application No. EP 07019286.9, dated Jan. 14, 2009.

(Continued)

*Primary Examiner* — Rexford Barnie
*Assistant Examiner* — Scott Bauer
(74) *Attorney, Agent, or Firm* — Husch Blackwell LLP

(57) ABSTRACT

To provide a highly reliable semiconductor device (an RF tag) which operates normally even when a communication distance is extremely short, a protection circuit (a limiter circuit) for protecting an element which forms a semiconductor device (an RF tag) capable of wirelessly communicating data is provided. When the DC power supply potential which is generated in a rectifier circuit is equal to or greater than a predetermined value (a reference value), the protection circuit is made to operate, and the value of the generated DC power supply potential is reduced. On the other hand, when the DC power supply potential which is generated in the rectifier circuit is equal to or less than the predetermined value (reference value), the protection circuit is made not to operate, and the value of the generated DC power supply potential is used without change.

16 Claims, 10 Drawing Sheets

U.S. PATENT DOCUMENTS

| | | |
|---|---|---|
| 2007/0102517 A1 | 5/2007 | Minami et al. |
| 2008/0094027 A1 | 4/2008 | Cho |
| 2008/0094180 A1 | 4/2008 | Kato et al. |
| 2008/0143531 A1 | 6/2008 | Tadokoro |
| 2008/0150475 A1 | 6/2008 | Kato et al. |
| 2008/0158926 A1 | 7/2008 | Umeda et al. |
| 2008/0174408 A1 | 7/2008 | Takahashi |
| 2008/0311850 A1 | 12/2008 | Ootaka et al. |
| 2008/0318523 A1 | 12/2008 | Umeda et al. |

FOREIGN PATENT DOCUMENTS

| | | |
|---|---|---|
| JP | 2002-176141 | 6/2002 |
| JP | 2002-368647 | 12/2002 |
| JP | 2005-150207 | 6/2005 |
| JP | 2006-5651 | 1/2006 |
| JP | 2006-180073 | 7/2006 |
| JP | 2007-43568 | 2/2007 |
| JP | 2008-123502 | 5/2008 |
| JP | 2008-177544 | 7/2008 |
| JP | 2008-524857 | 7/2008 |
| JP | 2008-181494 | 8/2008 |
| JP | 2008-181499 | 8/2008 |
| WO | WO 2006/066159 A2 | 6/2006 |
| WO | WO 2006/101285 A1 | 9/2006 |

OTHER PUBLICATIONS

European Search Report re application No. EP 07019286.9, dated Mar. 13, 2009.

International Search Report re application No. PCT/JP2009/066850, dated Oct. 27, 2009.

Written Opinion re application No. PCT/JP2009/066850, dated Oct. 27, 2009.

\* cited by examiner

1101

1102

1103

1104a 1104b 1104c 1104d 1104e 1104f 1104g

SEMICONDUCTOR DEVICE

TECHNICAL FIELD

The present invention which is disclosed in this specification relates to a semiconductor device (a data carrier) capable of communicating (transmitting and receiving) data wirelessly. In particular, the present invention relates to a protection circuit which prevents breakage or deterioration of elements which are included in a semiconductor device when the semiconductor device receives high power in wireless communication.

BACKGROUND ART

In recent years, identification technology by which an ID number (identification number) is assigned to an individual object to clarify the history of information thereof, which is utilized for production, management, or the like, has attracted attention. In particular, an RFID (radio frequency identification) technique that transmits and receives data by wireless communication has been widely used. A wireless communication system using the RFID technique is a communication system including a wireless communication device (an interrogator) and a data carrier (a transponder) and communicating data wirelessly therebetween. The wireless communication device refers to a device capable of wirelessly transmitting and receiving signals, such as a reader/writer, a cellular phone, or a personal computer. In this specification, the wireless communication device is typically referred to as a reader/writer. In addition, in this specification, the data carrier is generally called as an RF tag, an ID tag, an IC tag, an IC chip, a wireless tag, an electronic tag, or the like, and the data carrier is typically referred to as an RF tag.

Examples of RF tags include passive RF tags which do not have power sources and active RF tags which incorporate power sources. The passive RF tag has a function to convert a wireless signal generated from a reader/writer (a carrier wave or an amplitude modulation wave generated by superimposing a modulation wave on a carrier wave) into an DC voltage by a rectifier circuit which is provided in the RF tag, and circuits in the RF tag operate using the DC voltage. The strength of the carrier wave is generally expressed as power, and power is attenuated in proportion to the squared distance between a radiant point of the power and a measurement point of the power (hereinafter referred to as a communication distance in this specification). In other words, when the distance between the reader/writer and the RF tag is changed, power which is supplied to the RF tag is also changed in accordance with the change in distance. Then, in the case where the communication distance between the reader/writer and the RF tag is extremely short (for example, in the case where both of them are in contact with each other), high power is supplied to the RF tag. When the RF tag is supplied with high power, the RF tag might malfunction because of incorrect demodulation of signals from the reader/writer or deterioration or break of elements provided in the RF tag.

On the other hand, the wireless communication system using the RFID technique has an advantage that data in a plurality of RF tags can be read at the same time by a reader/writer; however, when the data of the plurality of RF tags is read at the same time, a communication distance between each of the plurality of RF tags and the reader/writer might be different. Further, the communication distance varies from hour to hour, in the case where a carton of products provided with an RF tag is passed through a reader/writer by using a forklift. In view of the foregoing uses of such a wireless communication system, the communication distance might be extremely short unintentionally, and as a result, high power might be supplied to an RF tag.

In response to such a problem, provision of a protection circuit which protects elements in an RF tag when high power is applied to the RF tag has been known (for example, see Reference 1).

The protection circuit has a function to control the state of a dedicated path which makes high power escape. When the communication distance is long and received power is low, the dedicated path which makes high power escape is made in an off state so that the operation of the RF tag is not adversely affected. On the other hand, when the communication distance is short and received power is high, the dedicated path which makes high power escape is made in an on state so that high power is not applied to the elements in the RF tag.

REFERENCE

Patent Document

[Reference 1] Japanese Published Patent Application No. 2006-180073

DISCLOSURE OF INVENTION

Since the operation of a protection circuit is similar to the operation of a modulation circuit using a load modulation method (which is provided in an RF tag), a signal which is transmitted from the RF tag to a reader/writer is adversely affected in no small measure. In particular, when the protection circuit outputs a signal including electrical noise, the electrical noise is directly transmitted to the signal transmitted from the RF tag to the reader/writer, and communication between the reader/writer and the RF tag is hindered.

One embodiment of the present invention is made in view of the above problems, and it is an object to provide a highly reliable semiconductor device (an RF tag) which operates normally also in the case where a communication distance is extremely short.

One embodiment of the present invention employs the following structure to solve the above problems. In other words, according to one embodiment of the present invention, a protection circuit (also referred to as a limiter circuit) for protecting an element which is included in a semiconductor device (an RF tag) capable of wirelessly communicating data is provided. Then, when the level of a DC power supply potential which is generated in a rectifier circuit is equal to or greater than a predetermined level (a reference level), the protection circuit is made to operate, and the level of the generated DC power supply potential is reduced. On the other hand, when the DC power supply potential which is generated in the rectifier circuit is equal to or less than the predetermined level (the reference level), the protection circuit is made not to operate, and the level of the generated DC power supply potential is used without change.

One structure according to one embodiment of the present invention includes a protection circuit and a rectifier circuit which rectifies a carrier wave or an amplitude modulation wave which is received through an antenna. The rectifier circuit includes a first diode and a capacitor. The protection circuit includes a first resistor, a second resistor, a second diode, a p-channel transistor, and a switch. An anode of the first diode is electrically connected to one end of the antenna and one end of the switch; a cathode of the first diode is electrically connected to one electrode of the capacitor, one end of the first resistor, and one of a source and a drain of the transistor; the other end of the first resistor is electrically connected to a gate of the transistor and an anode of the second diode; the other of the source and the drain of the transistor is electrically connected to one end of the second resistor; and a cathode of the second diode and the other end of the second resistor are electrically connected to the other end of the antenna, the other end of the switch, and the other electrode of the capacitor. In addition, the switch is controlled to be turned on or off in accordance with a potential between the other of the source and drain of the transistor and one end of the second resistor.

In the structure according to the above embodiment, the switch is turned on when a potential of a node between one end of the second resistor and one of the source and the drain of the transistor is higher than a predetermined potential, and the switch is turned off when the potential of the node between one end of the second resistor and one of the source and the drain of the transistor is lower than the predetermined potential.

In addition, another structure according to one embodiment of the present invention includes a protection circuit and a rectifier circuit which rectifies a carrier wave or an amplitude modulation wave which is received through an antenna. The rectifier circuit includes a first diode and a capacitor. The protection circuit includes a first resistor, a second resistor, a second diode, a p-channel first transistor, and an n-channel second transistor. An anode of the first diode is electrically connected to one end of the antenna and one of a source and a drain of the second transistor; a cathode of the first diode is electrically connected to one electrode of the capacitor, one end of the first resistor, and one of a source and a drain of the first transistor; the other end of the first resistor is electrically connected to a gate of the first transistor and an anode of the second diode; the other of the source and the drain of the first transistor is electrically connected to one end of the second resistor; a cathode of the second diode and the other end of the second resistor are electrically connected to the other end of the antenna, the other of the source and the drain of the second transistor, and the other electrode of the capacitor; and the other of the source and the drain of the first transistor and one end of the second resistor are electrically connected to a gate of the second transistor.

In addition, the first diode includes a diode-connected transistor, a lateral PN junction diode, or a lateral PIN junction diode. The second diode includes a plurality of diode-connected transistors which are connected in series, a lateral PN junction diode, or a lateral PIN junction diode.

The semiconductor device according to any one of the above embodiments of the present invention further includes the antenna, a demodulation circuit, a constant voltage circuit, a logic circuit, and a modulation circuit.

Alternatively, the semiconductor device according to any one of the above embodiments of the present invention further includes the antenna, a demodulation circuit, a constant voltage circuit, a logic circuit, a modulation circuit, and a clock generation circuit.

In addition, the semiconductor device (the RF tag) according to any one of the above embodiments of the present invention can be applied to an RF tag which does not have dependence on a frequency band for communication with a reader/writer and which is used for an arbitrary frequency band. Specifically, the RF tag according to any one of the above embodiments of the present invention can be applied to any of the cases of an HF band with a frequency of 3 MHz to 30 MHz (for example, 13.56 MHz), a UHF band with a frequency of 300 MHz to 3 GHz (for example, 433 MHz, 953 MHz, or 2.45 GHz), and a frequency of 135 kHz.

The RF tag according to any one of the above embodiments of the present invention includes all devices capable of communicating data wirelessly, such as an ID tag, an IC tag, an IC chip, a wireless tag, and an electronic tag.

When it is described in this specification that "A and B are electrically connected to each other", the case where A and B are electrically connected to each other (i.e., the case where A and B are connected to each other by interposing another element or another circuit therebetween), the case where A and B are functionally connected to each other (i.e., the case where A and B are functionally connected by interposing another circuit therebetween), and the case where A and B are directly connected to each other (i.e., the case where A and B are connected to each other without interposing another element or another circuit therebetween) are included.

An RF tag having a protection circuit according to one embodiment of the present invention can protect an internal element from high power which is received by the RF tag even when the communication distance is extremely short. Therefore, improvement in reliability of the RF tag can be achieved. In addition, the protection circuit according to the above embodiment of the present invention can prevent transmission of electrical noise to an output signal of the protection circuit because the protection circuit operates without using a signal which has electrical noise easily. As a result, transmission of electrical noise to a transmission signal from an RF tag to a reader/writer can be prevented and thus stable communication can be performed between the reader/writer and the RF tag.

BEST MODE FOR CARRYING OUT THE INVENTION

Figure 1:
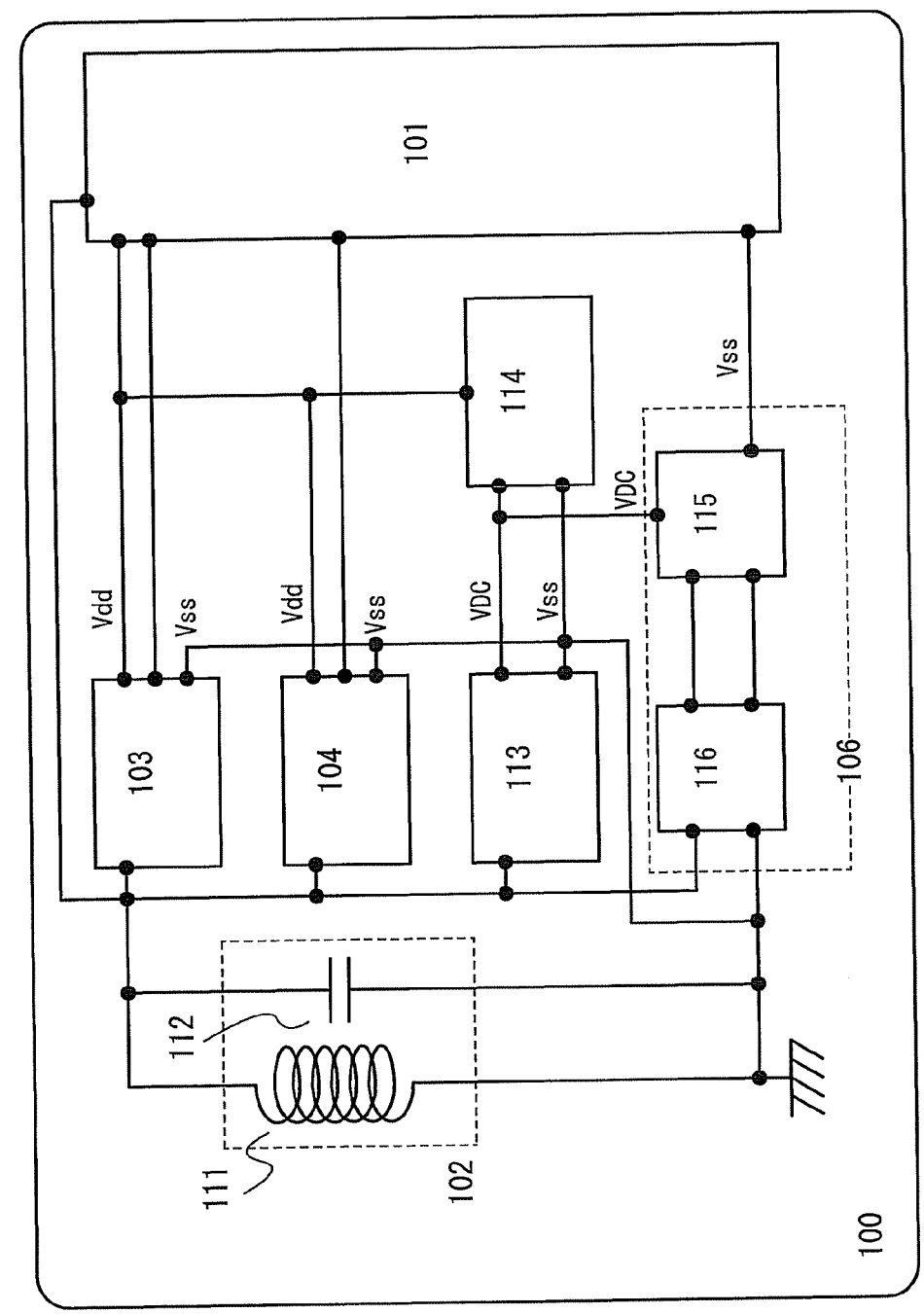
FIG. 1 is a block diagram showing the whole RF tag according to one embodiment of the present invention.

Embodiments and an example of the present invention will be described in detail with reference to the accompanying drawings. However, the present invention is not limited to the description below, and it is easily understood by those skilled in the art that modes and details thereof can be modified in various ways without departing from the spirit and the scope of the present invention. Therefore, in the embodiments and example of the present invention which will be described below, the same portions are commonly denoted by the same reference numerals in different drawings.

In addition, each of the embodiments and example described below can be implemented by being combined with any of the other embodiments and example which are described in this specification unless otherwise mentioned.

Embodiment 1

FIG. 1 shows a block diagram of the whole RF tag which is used as one embodiment of the present invention. An RF tag 100 includes the following: a logic circuit 101 for performing functional processing such as generation of a response signal based on received data; an antenna circuit 102 for transmitting and receiving (communicating) a signal between a reader/writer and the RF tag; a demodulation circuit 103 for demodulating an amplitude modulation wave (generated by superimposing a modulation wave on a carrier wave) which is received in the antenna circuit 102 and for extracting a pulse signal; a modulation circuit 104 for modulating a carrier wave outputted from the reader/writer in accordance with a response signal outputted from the logic circuit 101 and for transmitting a response signal to the reader/writer; a rectifier circuit 113 for generating DC voltage from the carrier wave or amplitude modulation wave which is received in the antenna circuit 102; and a protection circuit 106 for preventing application of overvoltage to internal circuits.

The antenna circuit 102 includes an antenna 111 and a resonant capacitor 112. The antenna 111 has different capability of receiving a carrier wave from the reader/writer depending on its shape or the number of windings; however, the present invention is not particularly limited. The resonant capacitor 112 is a capacitor provided to optimize the resonance frequency of the antenna circuit 102 to the frequency of the carrier wave from the reader/writer by being combined with the antenna 111. Note that although the resonant capacitor 112 is provided in this embodiment, it is not necessarily provided, and in the case where the resonant capacitor 112 is not provided, the frequency of the carrier wave from the reader/writer may be optimized only with the antenna 111.

The rectifier circuit 113 has functions to rectify the carrier wave or amplitude modulation wave which is received in the antenna circuit 102 and to generate DC voltage $V_{DC}$. The potential of the DC voltage $V_{DC}$ which is generated in the rectifier circuit 113 varies depending on power which is the magnitude of the carrier wave. When the power is high, the DC voltage $V_{DC}$ also becomes high, and when the power is low, the DC voltage $V_{DC}$ also becomes low.

A constant voltage circuit 114 has a function to supply the DC voltage $V_{DC}$ that varies depending on the level of power to the logic circuit 101 by being made to have a constant power supply potential Vdd (can also be referred to as a high power supply potential). When the supplied potential is varied, the operation of the logic circuit 101 becomes unstable. Therefore, it is necessary that a constant potential be supplied to the logic circuit 101. In this embodiment, the constant power supply potential Vdd is supplied to the logic circuit 101 by the constant voltage circuit 114. Note that in each of circuits included in the RF tag 100, a low power supply potential (hereinafter referred to as $V_{SS}$) is common, and $V_{SS}$ can be set to GND (=0 V), for example.

The protection circuit 106 includes a voltage detection circuit 115 for monitoring the voltage which is outputted from the rectifier circuit 113 and supplied to the internal circuits such as the logic circuit 101, the demodulation circuit 103, and the modulation circuit 104; and a switch 116 which is controlled to be turned on or off depending on voltage which is detected in the voltage detection circuit 115. The protection circuit 106 has functions to operate when the voltage of the carrier wave from the reader/writer has high amplitude and to reduce the amplitude of the voltage of the carrier wave. As a result, breakage or deterioration of the internal circuits such as the demodulation circuit 103, the modulation circuit 104, and the rectifier circuit 113 can be prevented. In addition, when the amplitude of the voltage of the carrier wave is reduced, the level of the DC voltage $V_{DC}$ which is outputted by the rectifier circuit 113 in accordance with reduction in the amplitude is also reduced. Thus, breakage or deterioration of the internal circuits such as the constant voltage circuit 114 can also be prevented.

Figure 2:
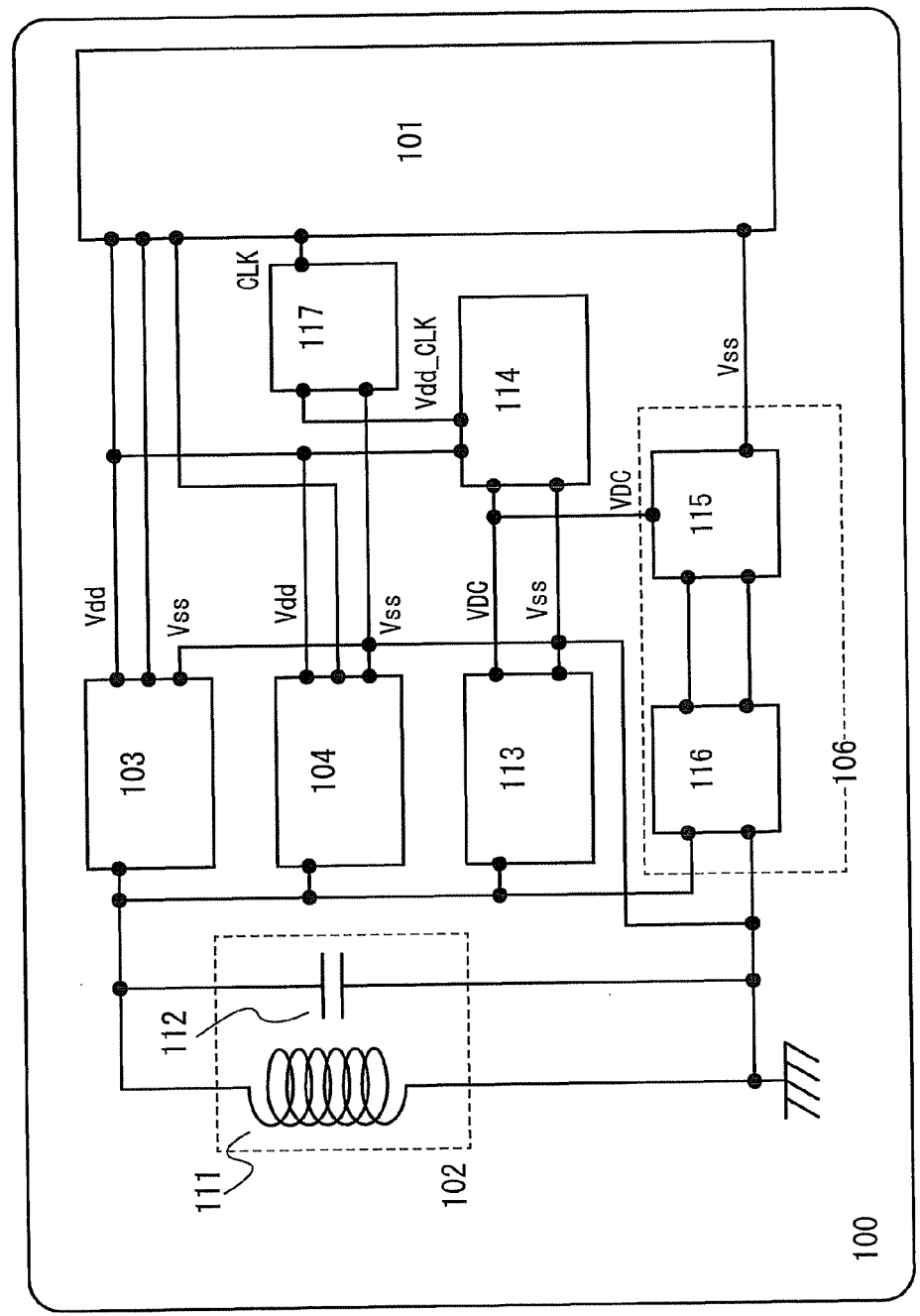
FIG. 2 is a block diagram showing the whole RF tag according to one embodiment of the present invention.

Note that the configuration of the RF tag 100 shown in FIG. 1 is a structure in the case where the carrier wave or amplitude modulation wave which is received in the antenna circuit 102 is processed as appropriate with a circuit included in the logic circuit 101 and a clock signal CLK which is necessary for the operation of the logic circuit 101 is generated. When the clock signal CLK which is necessary for the operation of the logic circuit 101 is generated without referring to the carrier wave or amplitude modulation wave which is received in the antenna circuit 102, a configuration in which a clock generation circuit 117 is additionally provided in the RF tag 100 as shown in FIG. 2 may be employed. In particular, in a remote RF tag for performing communication with a reader/writer with a frequency of 300 MHz to 3 GHz (a UHF band), a configuration in which the clock generation circuit 117 is additionally provided is preferable.

The clock generation circuit 117 is required to have a function to supply the clock signal CLK having a constant frequency stably to the logic circuit 101. Therefore, in a manner similar to that of the above-described logic circuit 101, it is necessary that a constant potential be supplied to the clock generation circuit 117.

As the constant potential which is supplied to the clock generation circuit 117, the power supply potential Vdd which is generated in the constant voltage circuit 114 may be used in a manner similar to that of the logic circuit 101. However, the power supply potential Vdd is also supplied to the other circuits. When the power supply potential Vdd might be varied by the operation of the other circuits, it is preferable to employ a configuration in which a power supply potential Vdd_CLK which is different from the power supply potential Vdd supplied to the other circuits is generated in the constant voltage circuit 114 and the power supply potential Vdd_CLK is supplied to the clock generation circuit 117. By employing this configuration, it becomes easier to supply the clock signal CLK having a constant frequency stably from the clock generation circuit 117 to the logic circuit 101.

Note that in the RF tag 100 shown in FIG. 2, circuits similar to the circuits included in the RF tag 100 shown in FIG. 1 can be used for circuits other than the clock generation circuit 117; thus, descriptions thereof are omitted here.

Embodiment 2

Figure 3:
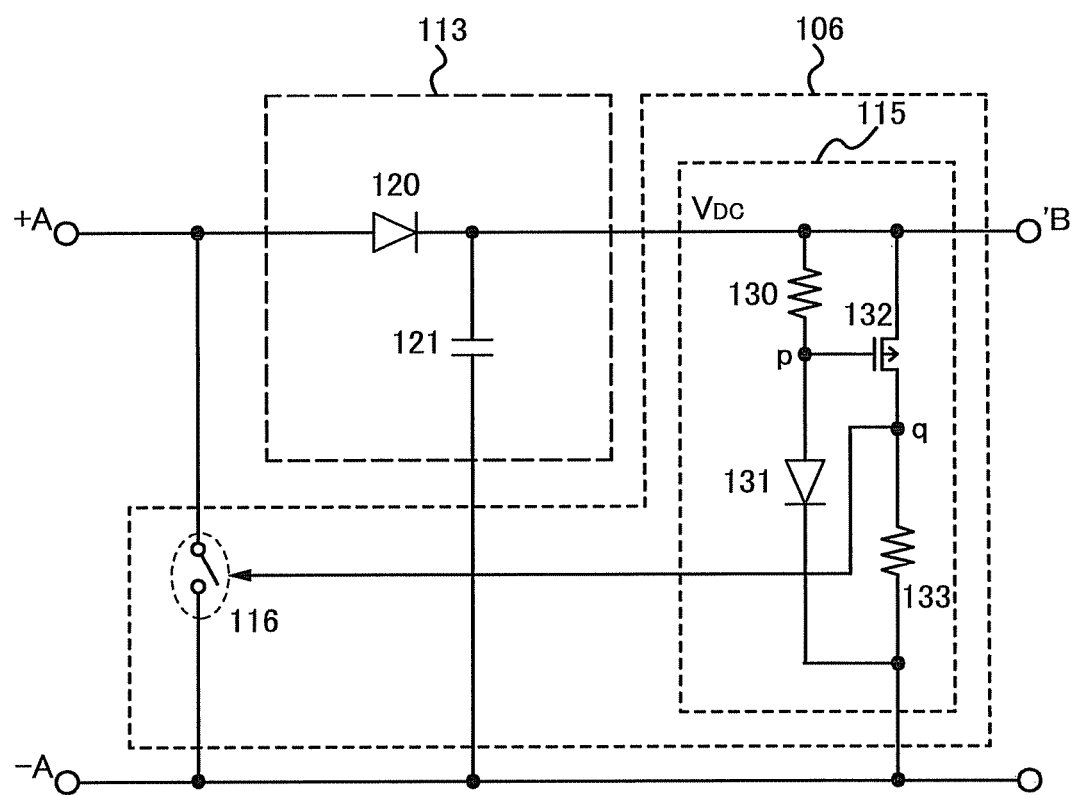
FIG. 3 is a circuit diagram showing an example of a rectifier circuit and a protection circuit according to one embodiment of the present invention.

In this embodiment, the configuration and operation of the rectifier circuit and protection circuit which are described in Embodiment 1 will be described. FIG. 3 shows an example of a circuit configuration of a rectifier circuit and a protection circuit according to one embodiment of the present invention.

The rectifier circuit 113 includes a diode 120 and a capacitor 121. An anode of the diode 120 is electrically connected to one end of the antenna (in FIG. 3, electrically connected to a +A terminal side), and a cathode of the diode 120 is electrically connected to one electrode of the capacitor 121. In addition, the other electrode of the capacitor 121 is electrically connected to the other end of the antenna (in FIG. 3, electrically connected to a −A terminal side).

Note that since an antenna is a balanced device, a sine wave having a certain frequency is inputted into each of one end and the other end of the antenna in the RF tag. A signal of one end and a signal of the other end of the antenna are in a relation where the phases of the signals are shifted by 180°. However, in order to describe the circuits briefly, the description is given below with a potential of the other end of the antenna assumed as a fixed potential (0 V).

The operation of the rectifier circuit 113 is described. When a carrier wave or an amplitude modulation wave from a reader/writer is received in the antenna, this carrier wave or amplitude modulation wave is rectified to (converted into) the DC voltage $V_{DC}$ by the diode. The DC voltage $V_{DC}$ is held by accumulation of charge in the capacitor 121. The generation of the DC voltage $V_{DC}$ enables the circuits such as the logic circuit which is provided in the following stage of the rectifier circuit to operate by acquiring the power supply of the circuits.

Figure 4:
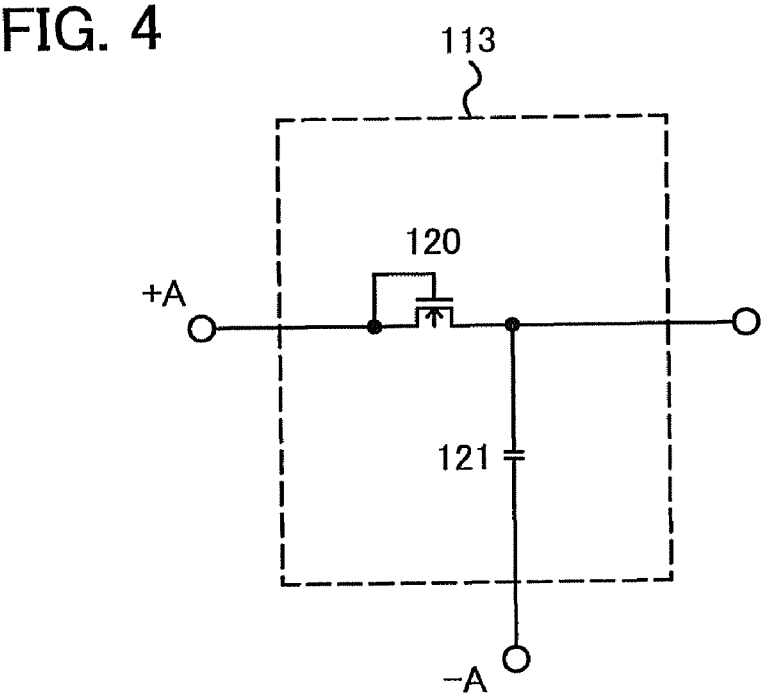
FIG. 4 is a circuit diagram showing an example of a rectifier circuit according to one embodiment of the present invention.

The kind of diode 120 is not particularly limited, and a PN diode, a PIN diode, a Schottky barrier diode, a constant voltage diode (a zener diode), a diode-connected transistor, or the like can be used. For example, as shown in FIG. 4, an n-channel transistor in which a gate and one of a source and a drain are diode-connected can be used. Alternatively, a p-channel transistor in which a gate and one of a source and a drain are diode-connected can be used. Further alternatively, a transistor group in which a plurality of diode-connected transistors are connected in series (hereinafter referred to as a diode-connected transistor group) can be used. In the case of using a PN diode or a PIN diode, it is preferable to use a lateral junction diode. This is because, in the case of using a lateral PN junction diode or a lateral PIN junction diode as the diode 120, the diode 120 can be manufactured at the time of manufacturing the diode without changing the existing process over the same substrate as a transistor which is necessary in forming a semiconductor device such as an RF tag. Note that these various types of diodes can be used as appropriate not only for the diode 120 but also for all of the diodes used in the present invention.

In addition, a configuration in which a plurality of stages of the rectifier circuit 113 having the circuit configuration shown in FIG. 3 are connected in series can also be employed. In this case, as compared to the case in which one stage of the rectifier circuit 113 having the circuit configuration shown in FIG. 3 is provided, the higher DC voltage $V_{DC}$ can be generated.

Next, the protection circuit 106 is described. The protection circuit 106 includes the voltage detection circuit 115 and the switch 116. The protection circuit 106 detects the level of the DC voltage $V_{DC}$ in the voltage detecting circuit 115, and has functions to turn the switch 116 off when the level of the DC voltage $V_{DC}$ is smaller than a reference level and to turn the switch 116 on when the level of the DC voltage $V_{DC}$ is higher than the reference level.

Figure 6:
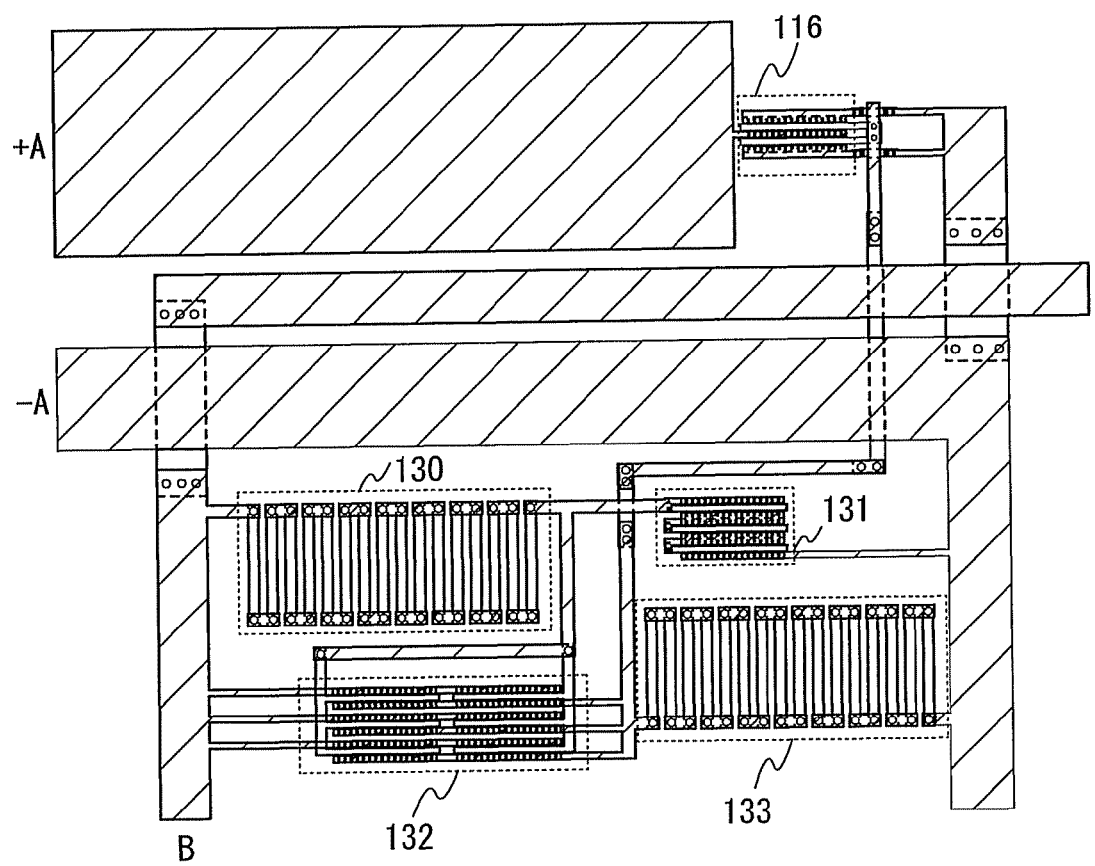
FIG. 6 is a top view (a layout) showing an example of a protection circuit according to one embodiment of the present invention.

Examples of a specific circuit configuration of the protection circuit 106 having such functions are described with reference to FIG. 3 and FIG. 6. FIG. 6 shows a layout (a top view) of the protection circuit 106. FIG. 6 shows a layout in which elements of an n-channel transistor 116 which is used as the switch, a resistor 130, a diode 131, a p-channel transistor 132, and a resistor 133 are connected through wirings.

Note that in the protection circuit according to one embodiment of the present invention, the use of a resistor having a two-terminal element like the resistor 133 shown in FIG. 3 is preferable to the use of a resistor having a three-terminal element. For example, in a field-effect transistor which is an example of a three-terminal element, the amount of current that flows between a source and a drain varies in accordance with a potential applied to a gate. Therefore, when a field-effect transistor is used as the resistor 133, the operation of the protection circuit might become unstable if variation is generated in a potential applied to a gate.

In addition, the constant voltage circuit 114 can be used as an example of a control circuit which applies a potential to a gate; however, it is difficult to apply a stable potential to a gate even when the constant voltage circuit 114 is used as the control circuit. From such a reason, it is difficult to make the operation of the protection circuit stable in the case of using a three-terminal element as the resistor 133.

On the other hand, in the case of using a two-terminal element as the resistor 133, a possibility of such a problem can be suppressed. As an example of the two-terminal element, a resistance wiring using a semiconductor having electrical resistivity higher than that of metal (for example, silicon) as a material can be given. In addition, as another example of the two-terminal element, a diode-connected transistor can also be used. In this embodiment, as shown in FIG. 6, a resistance wiring using silicon as a material is used for the resistor 133; however, the present invention is not limited to this configuration.

The voltage detection circuit 115 includes the resistor 130, the diode 131, the p-channel transistor 132, and the resistor 133. One end of the resistor 130 and one of a source and a drain of the transistor 132 are electrically connected to the cathode of the diode 120 of the rectifier circuit 113 and one electrode of the capacitor 121. In addition, the other end of the resistor 130 is electrically connected to a gate of the transistor 132 and an anode of the diode 131. In addition, the other of the source and the drain of the transistor 132 is electrically connected to one end of the resistor 133. Further, a cathode of the diode 131 and the other end of the resistor 133 are electrically connected to the other electrode of the capacitor 121 of the rectifier circuit 113.

In addition, one end of the switch 116 is electrically connected to the anode of the diode 120 of the rectifier circuit 113, and the other end of the switch 116 is electrically connected to the other electrode of the capacitor 121 of the rectifier circuit 113. Then, in accordance with a potential at a connection point q between one end of the resistor 133 and the other of the source and the drain of the transistor 132, the switch 116 is controlled to be turned on or off.

Figure 5:
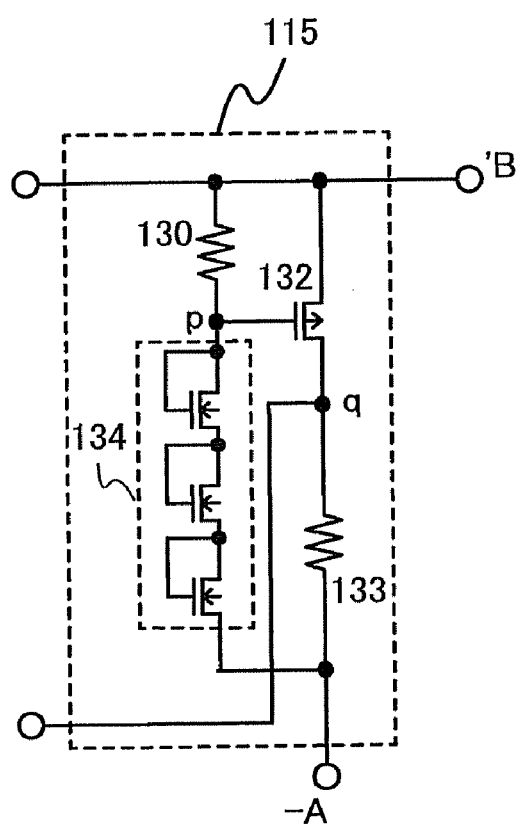
FIG. 5 is a circuit diagram showing an example of a protection circuit according to one embodiment of the present invention.

Various types of diodes can be used as appropriate for the diode 131 in a manner similar to that of the diode 120 described above. The operation of the protection circuit 106 in the case where a diode-connected transistor group 134 is used as the diode 131 is described below with reference to FIG. 5.

As described above, it is the potential at the connection point q that controls the state of the switch 116, and this potential is determined by the resistance ratio between the transistor 132 and the resistor 133. In addition, the state of the transistor 132 is determined by the resistance ratio between the resistor 130 and the diode-connected transistor group 134.

When the DC voltage $V_{DC}$ is low and a potential at a connection point p between the gate of the transistor 132 and the other end of the resistor 130 is lower than the value of the voltage drop of the whole diode-connected transistor group 134, the diode-connected transistor group 134 is turned off. In this state, since the diode-connected transistor group 134 has much higher resistance than the resistor 130, the potential at the connection point p is almost equivalent to the DC voltage $V_{DC}$; thus, the transistor 132 is turned off. At this time, the resistor 133 has much lower resistance than the transistor 132 when the resistances of the transistor 132 and the resistor 133 are compared; therefore, the potential at the connection point q becomes almost equivalent to the potential at the other end of the resistor 133. As a result, the switch 116 is turned off.

On the other hand, when the DC voltage $V_{DC}$ is high and the potential at the connection point p is higher than the value of the voltage drop of the whole diode-connected transistor group 134, the diode-connected transistor group 134 is turned on. In this state, since the diode-connected transistor group 134 has much lower resistance than the resistor 130, the transistor 132 is turned on when the potential at the connection point p is lower than the DC voltage $V_{DC}$ and further the potential difference between the gate and the source ($V_{gs}$) of the transistor 132 is lower than the threshold voltage of the transistor 132. At this time, the resistor 133 has higher resistance than the transistor 132 when the resistances of the transistor 132 and the resistor 133 are compared. The potential at the connection point q is determined by the resistance ratio between the transistor 132 and the resistor 133; thus, the potential at the connection point q becomes higher than the potential at the other end of the resistor 133 as the DC voltage $V_{DC}$ becomes higher. Then, when the DC voltage $V_{DC}$ becomes much higher and the potential at the connection point q reaches a predetermined potential, the switch 116 is turned on.

As an example of the switch 116 that operates as described above, an n-channel transistor can be given. In the case of using an n-channel transistor, one end of the switch 116 corresponds to one of a source and a drain, the other end of the switch 116 corresponds to the other of the source and the drain, and an input destination of the potential at the connection point q corresponds to a gate. Note that it is preferable that an n-channel transistor in an on state having low resistance be used so that the protection circuit 106 has favorable characteristics.

In addition, when the frequency of a carrier wave is high, the carrier wave has characteristics of passing through the capacitor. Therefore, in order to hold the off state of the protection circuit 106, it is necessary to use an n-channel transistor having small parasitic capacitance. When the amount of parasitic capacitance is large, the off state of the protection circuit 106 cannot be held; thus, it becomes difficult to generate the DC voltage $V_{DC}$. As a result, the communication distance of the RF tag becomes short.

In addition, when an n-channel transistor is in an on state, high power passes in the vicinity of this transistor and heat is generated. As measures against the above, it is preferable to take measures to release heat, such as increase in the width of a wiring in the vicinity of an n-channel transistor or elimination of a film over the transistor.

In such a manner, the protection circuit 106 described in this embodiment operates without using a signal which has electrical noise easily; therefore, it can prevent transmission of electrical noise to an output signal of the protection circuit. As a result, transmission of electrical noise to a transmission signal from an RF tag to a reader/writer can be prevented and thus stable communication can be performed between the reader/writer and the RF tag.

Embodiment 3

A semiconductor device such as an RF tag includes a semiconductor integrated circuit which is formed using a plurality of minute semiconductor elements. A protection circuit according to one embodiment of the present invention is also formed using a semiconductor element. Therefore, malfunction of a circuit or damage of a semiconductor element due to electrostatic discharge (ESD) from the outside is likely to be caused. In particular, there is a high possibility that electrostatic discharge is caused to an RF tag having an antenna which is a conductor having a large surface area. In this embodiment, an example of a structure for protecting the semiconductor integrated circuit from such electrostatic discharge will be described.

Structural examples are shown in FIGS. 11A to 11D. In this embodiment, a semiconductor integrated circuit can be protected by providing a shielding body having a conductive material in the vicinity of the semiconductor integrated circuit. Note that the shielding body can be formed by a dry process such as a sputtering method, a plasma CVD method, or an evaporation method, or a wet process such as an application method, a printing method, or a droplet discharge method (an ink-jet method).

Figure 11A:
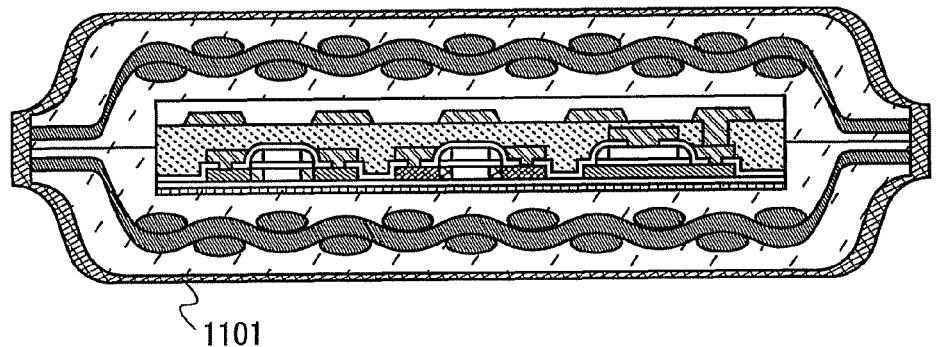
FIGS. 11A to 11D are cross-sectional views each showing an example of a structure in which measures against static electricity are taken for an RF tag according to one embodiment of the present invention.

FIG. 11A is an example in which a shielding body 1101 is formed so as to cover the entire outside of a semiconductor integrated circuit. The shielding body 1101 may be formed with a thickness that does not prevent, as much as possible, reception of a carrier wave or an amplitude modulation wave, which is generated from a reader/writer, by an antenna.

Note that in FIG. 11A, the shielding body 1101 is formed so as to cover a top surface, a bottom surface, and side surfaces of the semiconductor integrated circuit. Alternatively, as another formation method, the shielding body 1101 may be formed so as to cover the entire surface of the semiconductor integrated circuit chip in such a manner that the shielding body is formed on the top surface and parts of the side surfaces and then, by reversing the semiconductor integrated circuit, the shielding body is formed on the bottom surface and the other parts of the side surface.

Figure 11B:
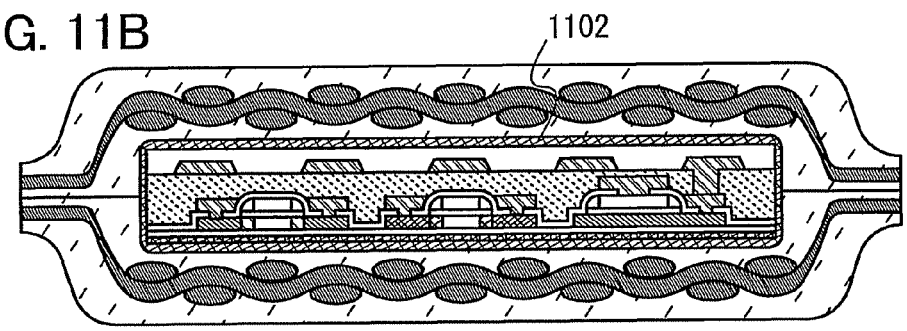

FIG. 11B is an example in which a shielding body 1102 is provided inside insulators so as to cover the entire surface of a semiconductor integrated circuit. In order to form the shielding body 1102 to cover the entire surface of the semiconductor integrated circuit in such a manner, it is necessary to cut the semiconductor integrated circuit individually into separate chips and to form the shielding body 1102 before the semiconductor integrated circuit is interposed between the insulators to be attached; however, the present invention is not particularly limited to this embodiment. For example, before the semiconductor integrated circuit is interposed between the insulators to be attached, the shielding body is formed in advance on a top surface and a bottom surface of the semiconductor integrated circuit, and the semiconductor integrated circuit is interposed between the insulators to be attached. After that, when the semiconductor integrated circuit is cut into separate chips by laser irradiation, the shielding body melts on a separation surface and the shielding body can be formed so as to cover the side surfaces of the semiconductor integrated circuit by adhering from above and bottom.

Figure 11C:
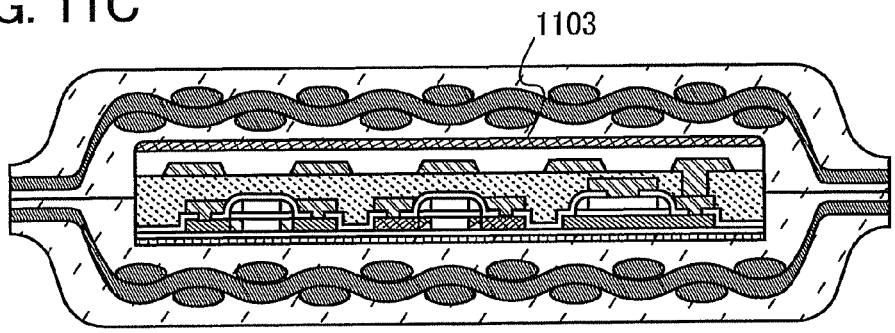

FIG. 11C is an example in which a shielding body 1103 is provided inside insulators and is formed only on one side of a semiconductor integrated circuit. In this example, the shielding body 1103 is formed on a side provided with an antenna; however, the shielding body 1103 may be formed on the opposite side.

A shielding body can be prevented from hindering reception of a carrier wave or an amplitude modulation wave, which is generated from a reader/writer, by an antenna by forming the shielding body only on one side of a semiconductor integrated circuit. Therefore, favorable communication precision can be ensured.

Figure 11D:
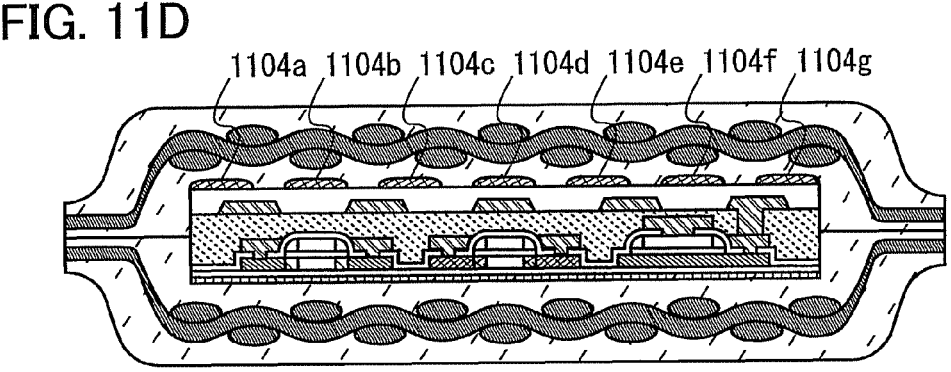

Although the example in which a shielding body is formed in a film shape using a conductive material is shown in each of FIGS. 11A to 11C, a shielding body 1104a, a shielding body 1104b, a shielding body 1104c, a shielding body 1104d, a shielding body 1104e, a shielding body 1104f, and a shielding body 1104g may be formed in island shapes as shown in FIG. 11D. The shielding bodies 1104a to 1104g each have conductivity because they are formed with a conductive material, and are formed on a semiconductor integrated circuit in a dotted manner with each other. Therefore, there is no conduction between the shielding bodies 1104a and 1104b and between the shielding bodies 1104c and 1104g, for example. In other words, the shielding bodies 1104a to 1104g can be regarded as a film equivalent to an insulator as a whole, though the shielding bodies 1104a to 1104g each have conductivity. When such a structure is employed, since the shielding bodies 1104a to 1104g each have conductivity, the semiconductor integrated circuit can be favorably protected from electrostatic discharge. At the same time, since the shielding bodies 1104a to 1104g can be regarded as a film equivalent to an insulator as a whole, the shielding bodies can be prevented from hindering reception of a carrier wave or an amplitude modulation wave, which is generated from a reader/writer, by an antenna. Therefore, favorable communication precision can be ensured.

As a material which is used for the shielding bodies described with reference to FIGS. 11A to 11D, a conductor or a semiconductor is preferable, and a metal film, a metal oxide film, a semiconductor film, or a metal nitride film can be given, for example. As a specific material, an element selected from titanium, molybdenum, tungsten, aluminum, copper, silver, gold, nickel, platinum, palladium, iridium, rhodium, tantalum, cadmium, zinc, iron, silicon, germanium, zirconium, and barium; or an alloy material, a compound material, a nitride material, an oxide material, or the like each containing any of the above elements as a main component can be used.

Note that as the nitride material, tantalum nitride, titanium nitride, or the like can be used.

As the oxide material, indium tin oxide (ITO), indium tin oxide containing silicon oxide (ITSO), organoindium, organotin, zinc oxide, or the like can be used. Alternatively, indium zinc oxide (IZO) containing zinc oxide (ZnO), zinc oxide (ZnO), zinc oxide containing gallium (Ga), tin oxide ($SnO_2$), indium oxide containing tungsten oxide, indium zinc oxide containing tungsten oxide, indium oxide containing titanium oxide, indium tin oxide containing titanium oxide, or the like can be used.

Alternatively, as the material which is used for the shielding bodies, a semiconductor film having conductivity, which is obtained by adding an impurity element or the like to a semiconductor, or the like can be used. For example, a polycrystalline silicon film containing phosphorus as an impurity element can be used.

In addition, as the material which is used for the shielding bodies, a conductive macromolecule polymer (a conductive polymer) may be used. As the conductive macromolecule, a so-called π electron conjugated conductive macromolecule can be used. As an example, polyaniline and/or its derivative, polypyrrole and/or its derivative, or polythiophene and/or its derivative can be given. Alternatively, a copolymer of two or more kinds of those materials can be given as another example.

Specific examples of a conjugated conductive macromolecule are given below: polypyrrole; poly(3-methylpyrrole); poly(3-butylpyrrole); poly(3-octylpyrrole); poly(3-decylpyrrole); poly(3,4-dimethylpyrrole); poly(3,4-dibutylpyrrole); poly(3-hydroxypyrrole); poly(3-methyl-4-hydroxypyrrole); poly(3-methoxypyrrole); poly(3-ethoxypyrrole); poly(3-octoxypyrrole); poly(3-carboxylpyrrole); poly(3-methyl-4-carboxylpyrrole); polyN-methylpyrrole; polythiophene; poly(3-methylthiophene); poly(3-butylthiophene); poly(3-octylthiophene); poly(3-decylthiophene); poly(3-dodecylthiophene); poly(3-methoxythiophene); poly(3-ethoxythiophene); poly(3-octoxythiophene); poly(3-carboxylthiophene); poly(3-methyl-4-carboxylthiophene); poly(3,4-ethylenedioxythiophene); polyaniline; poly(2-methylaniline); poly(2-octylaniline); poly(2-isobutylaniline); poly(3-isobutylaniline); poly(2-anilinesulfonic acid); or poly(3-anilinesulfonic acid); and the like.

In addition, a shielding body containing a conductive macromolecule may further contain an organic resin or a dopant (a halogen, a Lewis acid, an inorganic acid, an organic acid, a transition metal halide, an organic cyano compound, a nonionic surfactant, or the like).

In an RF tag having a protection circuit according to one embodiment of the present invention, reliability of the RF tag can be further improved by employing a structure in which a shielding body having a conductive material is provided in the vicinity of a semiconductor integrated circuit.

Embodiment 4

In this embodiment, usage examples of an RF tag provided with a protection circuit according to one embodiment of the present invention will be described with reference to FIGS. 10A to 10F. Although an RF tag can be used broadly, it may be used by being mounted in products such as bills, coins, securities, bearer bonds, certificates (driver's licenses, resident cards, or the like (see FIG. 10A)), containers for wrapping objects (wrapping paper, bottles, or the like (see FIG. 10C)), recording media (DVDs, video tapes, or the like (see FIG. 10B)), vehicles (bicycles or the like (see FIG. 10D)), products such as personal belongings (bags, glasses, or the like), foods, plants, animals, human bodies, clothes, commodities, or electronic devices (liquid crystal display devices, EL display devices, television sets, or cellular phones), or objects such as shipping tags of products (see FIGS. 10E and 10F).

An RF tag 4000 according to one embodiment of the present invention is fixed on products by, for example, being mounted on a printed wiring board, being attached to a surface thereof, or being embedded therein. For example, the RF tag 4000 is incorporated in paper of a book or an organic resin package to be fixed to each object. As for the RF tag 4000 according to one embodiment of the present invention, downsizing, thinness, and lightweight are achieved; thus, the design of an object itself is not impaired even after being fixed to the object. Further, bills, coins, securities, bearer bonds, documents, or the like can have identification functions by being provided with the RF tag 4000 according to one embodiment of the present invention, and the identification functions can be utilized to prevent counterfeits. Furthermore, the efficiency of a system such as an inspection system can be improved by providing the RF tag according to one embodiment of the present invention in, for example, containers for wrapping objects, recording media, personal belongings, foods, clothes, commodities, electronic devices, or the like. Even vehicles can have higher security against theft or the like by being provided with the RF tag according to one embodiment of the present invention.

As described above, by using the RF tag including a protection circuit according to one embodiment of the present invention for each of the uses described in this embodiment, an element in a circuit can stably operate without deterioration or break even in the case where the communication distance of the RF tag which communicates data within a given communication distance is changed or a signal is received within an extremely short distance and thus a high frequency signal with high power enough to break the element is supplied to the circuit. Therefore, reliability of identification functions or security of products can be improved.

Example 1

In this example, characteristics of a protection circuit according to one embodiment of the present invention will be described.

Figure 7:
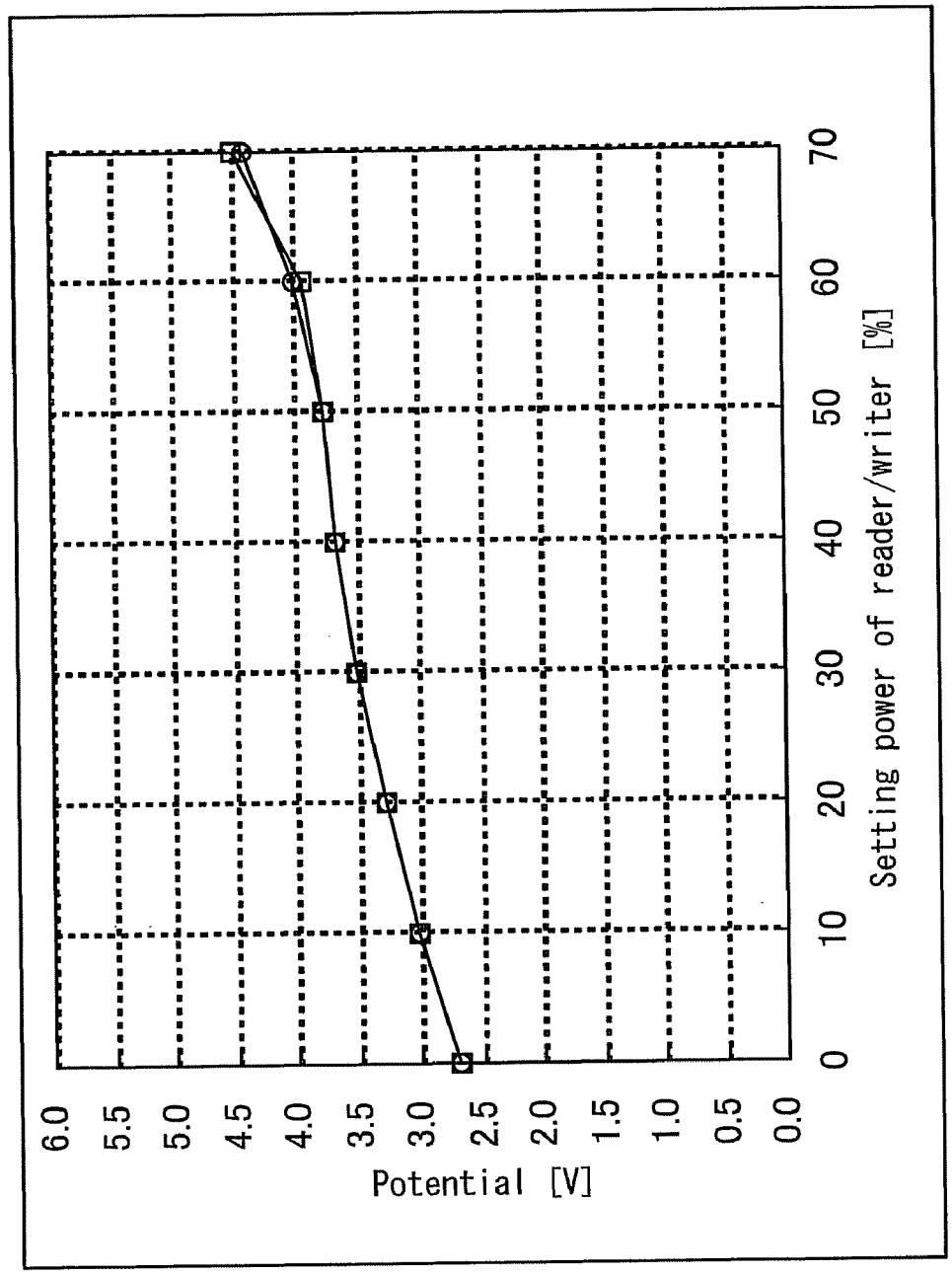
FIG. 7 is a graph showing characteristics of a protection circuit according to one embodiment of the present invention.
Figure 8:
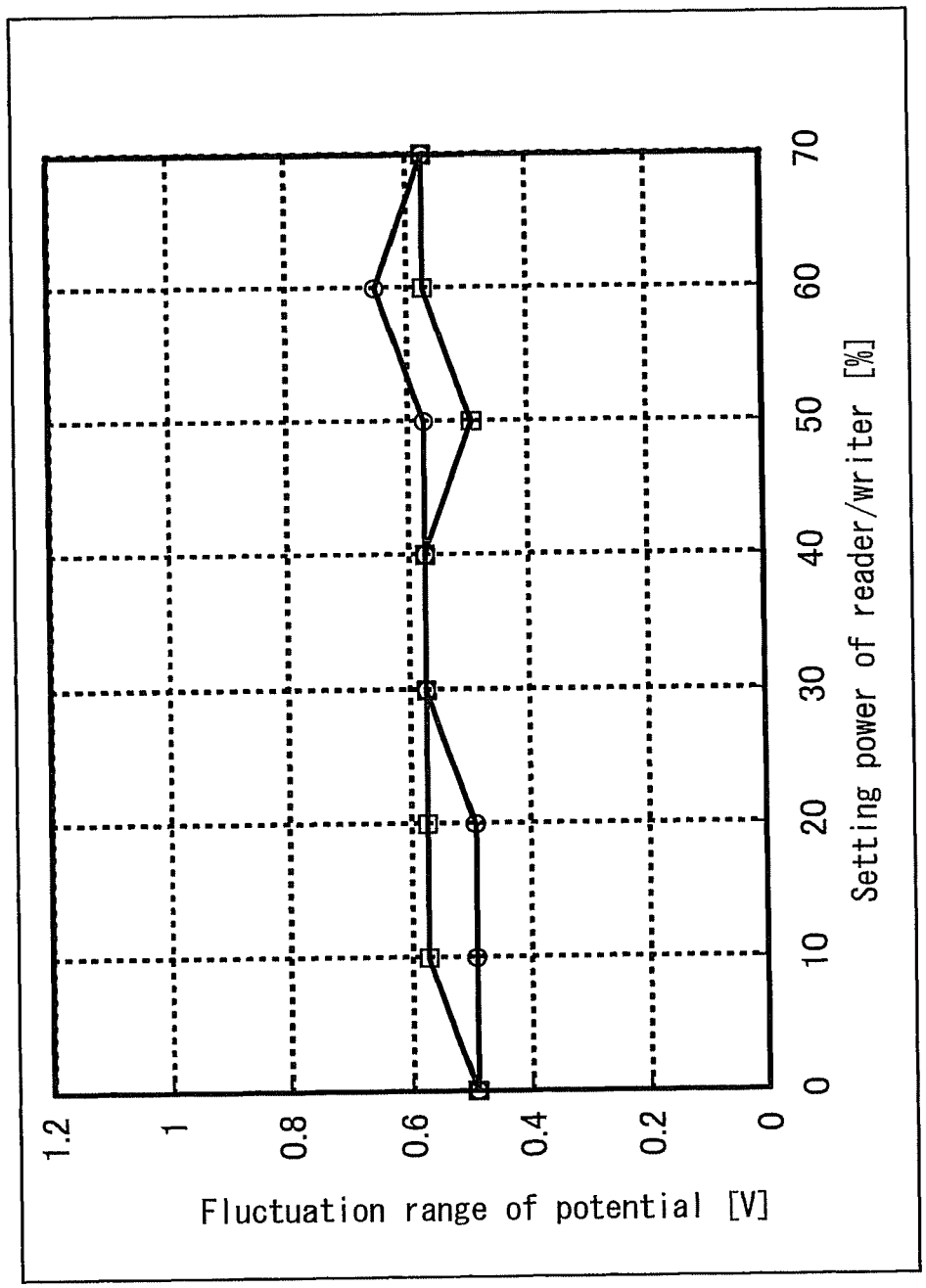
FIG. 8 is a graph showing characteristics of a protection circuit according to one embodiment of the present invention.

FIG. 7 is a graph which shows a result of a potential which is read out from a waveform of a signal that controls a switch of a protection circuit (hereinafter referred to as a switch control signal) when the level of setting power (an output signal) of a reader/writer is changed. In addition, FIG. 8 is a graph which shows a result of a fluctuation range of a potential which is read out from a waveform of a switch control signal when the level of the output signal of a reader/writer is changed. Here, the switch control signal corresponds to the potential at the connection point q in FIG. 3. In addition, the number of measurement samples is 2.

Figure 9:
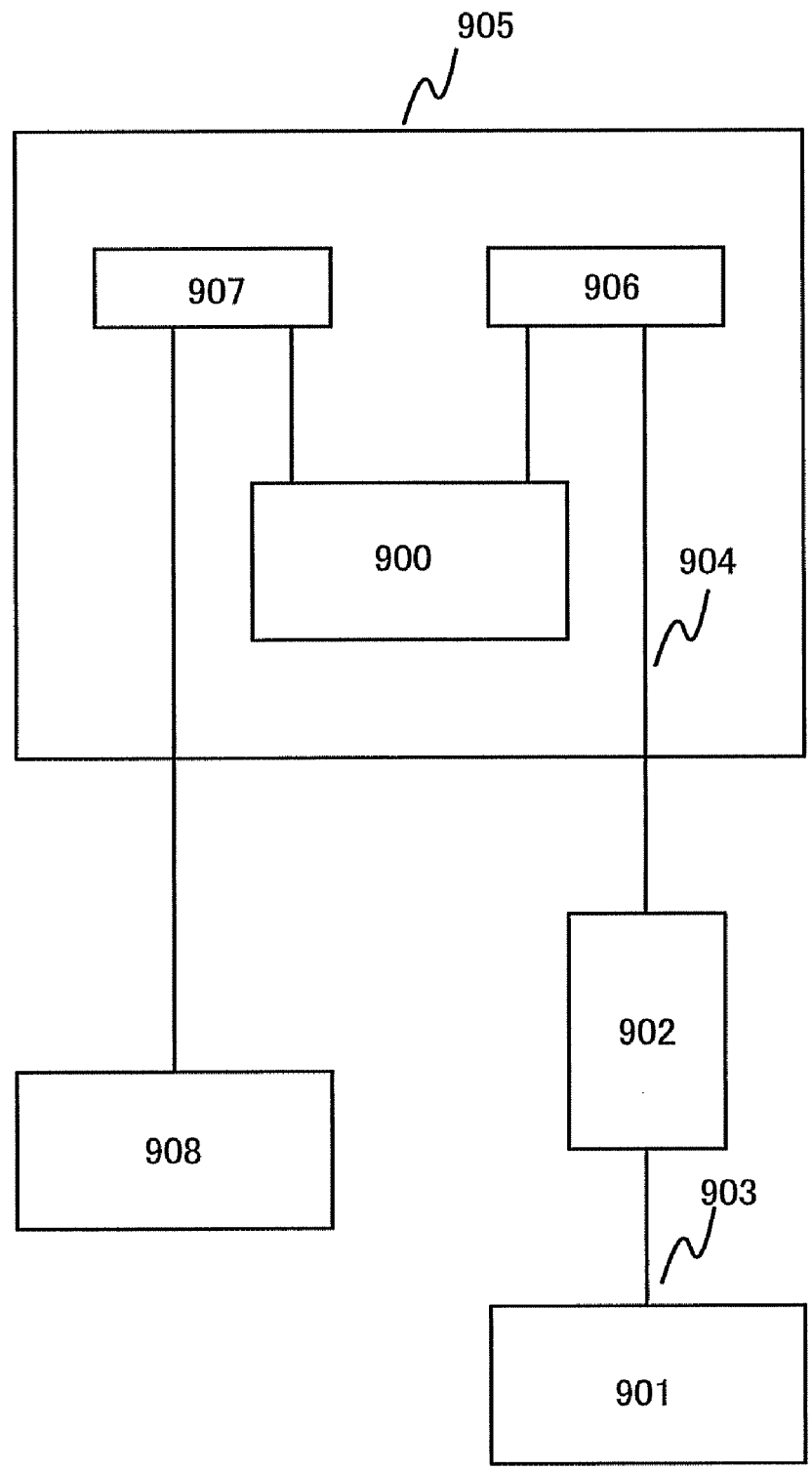
FIG. 9 is a block diagram showing a measurement environment for evaluating characteristics of a protection circuit according to one embodiment of the present invention.
Figure 10A:
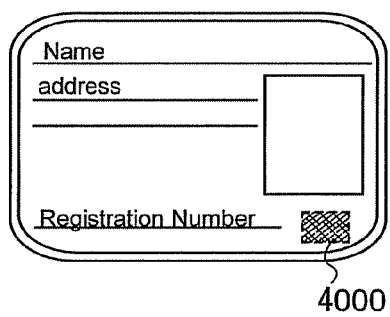
FIGS. 10A to 10F are views showing usage examples of an RF tag according to one embodiment of the present invention.
Figure 10B:
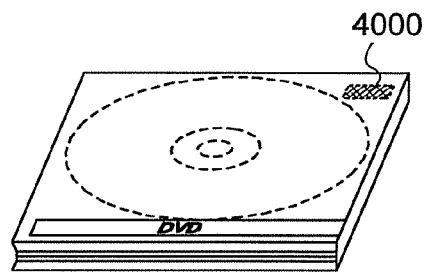
Figure 10C:
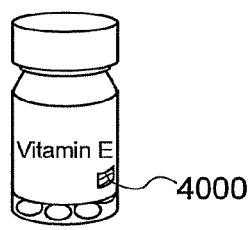
Figure 10D:
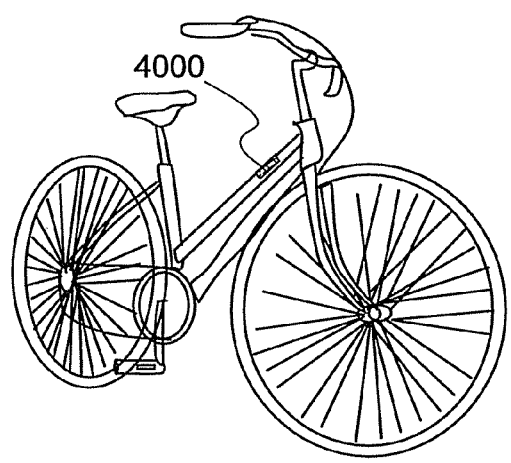
Figure 10E:
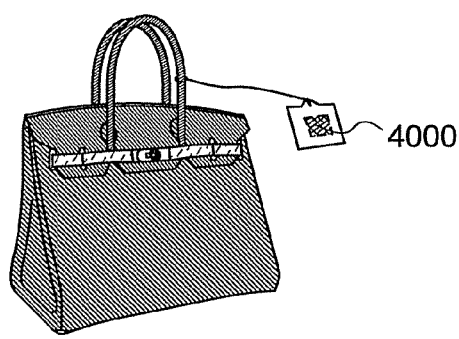
Figure 10F:
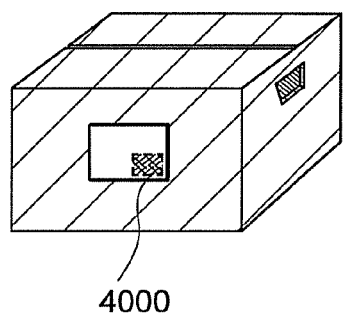

FIG. 9 shows a measurement environment in which the waveform of the switch control signal is observed. In this measurement, a reader/writer 901 (CRDK-900J-G2N produced by CDEX), an attenuator 902 (AT-1003 (40) produced by Hirose Electric Co., Ltd.), and a high-frequency measurement probe 906 (ACP40-LW-GSG-200 produced by Cascade Microtech, Inc.) are connected with coaxial cables 903 and 904. In addition, a pico probe 907 (Mode 128 produced by GGB Industries, Inc.) and an oscilloscope 908 (TDS3054B produced by Tektronix, Inc.) are connected. An RF tag 900 which is a measurement sample, the high-frequency measurement probe 906, and the pico probe 907 are provided for a manual prober provided in a radio shielding box 905.

Note that when the attenuator 902 has two terminals, which are referred to as a first terminal and a second terminal, a signal inputted from the first terminal is outputted to the second terminal, and a signal inputted from the second terminal is outputted to the first terminal.

As shown in FIG. 7, when the setting power of the reader/writer 901 is increased, the potential of the switch control signal is increased; however, there is a small fluctuation in potential within the range of 3.5 V to 4.5 V. From this result, it is found that the protection circuit 106 functions normally within this range. At this time, the level of the setting power of the reader/writer 901 is within the range of 40% to 70%.

In addition, as shown in FIG. 8, it is found that a fluctuation range of the potential of the switch control signal is within 0.4 V to 0.7 V regardless of the level of the setting power of the reader/writer 901 and thus almost no electrical noise is included in the switch control signal. As a result, the switch always operates stably regardless of the level of the setting power of the reader/writer 901. In other words, it can be said that the protection circuit according to one embodiment of the present invention can always operate stably.

As shown in the above results, by controlling a dedicated path which makes high power escape, using a switch, the protection circuit according to one embodiment of the present invention can protect an internal element from high power which is received by an RF tag when the communication distance is short. Therefore, reliability of the RF tag can be improved. In addition, the protection circuit according to one embodiment of the present invention has a structure in which electrical noise is not easily transmitted as a signal that controls the switch of the protection circuit. Therefore, even when the communication distance is short, stable communication can be performed between a reader/writer and the RF tag.

The present application is based on Japanese Patent Application serial No. 2008-254944 filed with Japan Patent Office on Sep. 30, 2008, the entire contents of which are hereby incorporated by reference.

EXPLANATION OF REFERENCE

100: RF tag, 101: logic circuit, 102: antenna circuit, 103: demodulation circuit, 104: modulation circuit, 106: protection circuit, 111: antenna, 112: resonant capacitor, 113: rectifier circuit, 114: constant voltage circuit, 115: voltage detection circuit, 116: switch, 117: clock generation circuit, 120: diode, 121: capacitor, 130: resistor, 131: diode, 132: p-channel transistor, 133: resistor, 134: diode-connected transistor group, 900: RF tag (measurement sample), 901: reader/writer, 902: attenuator, 903: coaxial cable, 904: coaxial cable, 905: radio shielding box, 906: high-frequency measurement probe, 907: pico probe, 908: oscilloscope, 1101: shielding body, 1102: shielding body, 1103: shielding body, 1104a: shielding body, 1104b: shielding body, 1104c: shielding body, 1104d: shielding body, 1104e: shielding body, 1104f: shielding body, 1104g: shielding body, 4000: RF tag

The invention claimed is:
1. A semiconductor device comprising:
a rectifier circuit configured to rectify a carrier wave or an amplitude modulation wave received through an antenna, the rectifier circuit including:
a first diode, wherein an anode of the first diode is electrically connected to one terminal of the antenna; and
a capacitor, wherein one electrode of the capacitor is electrically connected to a cathode of the first diode and the other electrode of the capacitor is electrically connected to the other terminal of the antenna,
a protection circuit electrically connected to the rectifier circuit, the protection circuit including;
a first resistor, wherein one terminal of the first resistor is electrically connected to the cathode of the first diode and one electrode of the capacitor;
a second diode, wherein an anode of the second diode is electrically connected to the other terminal of the first resistor;
a second resistor, wherein one terminal of the second resistor is electrically connected to a cathode of the second diode and the other terminal of the antenna;
a transistor, wherein one of a source and a drain of the transistor is electrically connected to the other terminal of the second resistor, the other of a source and a drain of the transistor is electrically connected to one terminal of the first resistor and the cathode of the first diode, and a gate of the transistor is electrically con- nected to the other terminal of the first resistor and the anode of the second diode; and a switch, wherein first terminal of the switch is electrically connected to the anode of the first diode and one terminal of the antenna, second terminal of the switch is electrically connected to the other terminal of the antenna, the other electrode of the capacitor, the cathode of the second diode and one terminal of the second resistor, and third terminal of the switch is electrically connected to one of a source and a drain of the transistor and the other terminal of the second resistor.

2. The semiconductor device according to claim 1, wherein the switch is turned on when a potential of the third terminal of the switch is higher than a predetermined potential, and the switch is turned off when the potential of the third terminal of the switch is lower than the predetermined potential.

3. The semiconductor device according to claim 1, wherein the first diode includes a diode-connected transistor, a lateral PN junction diode, or a lateral PIN junction diode.

4. The semiconductor device according to claim 1, wherein the second diode includes a plurality of diode-connected transistors which are connected in series, a lateral PN junction diode, or a lateral PIN junction diode.

5. The semiconductor device according to claim 1, further comprising the antenna electrically connected to the rectifier circuit.

6. The semiconductor device according to claim 1, further comprising a demodulation circuit, a constant voltage circuit, a logic circuit, and a modulation circuit.

7. The semiconductor device according to claim 1, further comprising a demodulation circuit, a constant voltage circuit, a logic circuit, a modulation circuit, and a clock generation circuit.

8. The semiconductor device according to claim 1, wherein the second resistor is a two-terminal device.

9. A semiconductor device comprising:
a rectifier circuit configured to rectify a carrier wave or an amplitude modulation wave received through an antenna, the rectifier circuit including:
a first diode, wherein an anode of the first diode is electrically connected to one terminal of the antenna; and
a capacitor, wherein one electrode of the capacitor is electrically connected to a cathode of the first diode and the other electrode of the capacitor is electrically connected to the other terminal of the antenna,
a protection circuit electrically connected to the rectifier circuit, the protection circuit including:
a first resistor, wherein one terminal of the first resistor is electrically connected to the cathode of the first diode and one electrode of the capacitor;
a second diode, wherein an anode of the second diode is electrically connected to the other terminal of the first resistor;
a second resistor, wherein one terminal of the second resistor is electrically connected to a cathode of the second diode and the other terminal of the antenna;
a first transistor, wherein one of a source and a drain of the first transistor is electrically connected to the other terminal of the second resistor, the other of a source and a drain of the first transistor is electrically connected to one terminal of the first resistor and the cathode of the first diode, and a gate of the first transistor is electrically connected to the other terminal of the first resistor and the anode of the second diode; and
a second transistor, wherein one of a source and a drain of the second transistor is electrically connected to the anode of the first diode and one terminal of the antenna, the other of a source and a drain of the second transistor is electrically connected to the other terminal of the antenna, the other electrode of the capacitor, the cathode of the second diode and one terminal of the second resistor, and a gate of the second transistor is electrically connected to one of a source and a drain of the first transistor and the other terminal of the second resistor.

10. The semiconductor device according to claim 9, wherein the second transistor is turned on when a potential of the gate of the second transistor is higher than a predetermined potential, and the second transistor is turned off when the potential of the gate of the second transistor is lower than the predetermined potential.

11. The semiconductor device according to claim 9, wherein the first diode includes a diode-connected transistor, a lateral PN junction diode, or a lateral PIN junction diode.

12. The semiconductor device according to claim 9, wherein the second diode includes a plurality of diode-connected transistors which are connected in series, a lateral PN junction diode, or a lateral PIN junction diode.

13. The semiconductor device according to claim 9, further comprising the antenna electrically connected to the rectifier circuit.

14. The semiconductor device according to claim 9, further comprising a demodulation circuit, a constant voltage circuit, a logic circuit, and a modulation circuit.

15. The semiconductor device according to claim 9, further comprising a demodulation circuit, a constant voltage circuit, a logic circuit, a modulation circuit, and a clock generation circuit.

16. The semiconductor device according to claim 9, wherein the second resistor is a two-terminal device.

* * * * *